(12) United States Patent
Sharma et al.

(10) Patent No.: US 12,174,288 B2
(45) Date of Patent: Dec. 24, 2024

(54) SYSTEM AND METHOD FOR DETERMINING ANGLE OF ARRIVAL IN A RADAR BASED POINT CLOUD GENERATION

(71) Applicant: Steradian Semiconductors Private Limited, Bengaluru (IN)

(72) Inventors: Ankit Sharma, Bengaluru (IN); Dibakar Sil, Hooghly (IN); Sai Gunaranjan Pelluri, Bengaluru (IN); Apu Sivadas, Bengaluru (IN); Gireesh Rajendran, Bengaluru (IN)

( * ) Notice: Subject to any disclaimer, the term of this patent is extended or adjusted under 35 U.S.C. 154(b) by 0 days.

(21) Appl. No.: 17/574,682

(22) Filed: Jan. 13, 2022

(65) Prior Publication Data

US 2023/0152436 A1   May 18, 2023

(51) Int. Cl.
| | |
|---|---|
| *G01S 13/42* | (2006.01) |
| *G01S 3/48* | (2006.01) |
| *G01S 5/06* | (2006.01) |
| *G01S 13/89* | (2006.01) |

(52) U.S. Cl.
CPC ............ *G01S 13/42* (2013.01); *G01S 3/48* (2013.01); *G01S 5/06* (2013.01); *G01S 13/89* (2013.01)

(58) Field of Classification Search
CPC . G01S 13/42; G01S 13/48; G01S 5/06; G01S 13/89
USPC ........................ 342/417, 450, 372, 374, 368
See application file for complete search history.

(56) References Cited

U.S. PATENT DOCUMENTS

| | | | |
|---|---|---|---|
| 2021/0055384 A1* | 2/2021 | Lee | ........................ G01S 7/4026 |
| 2021/0116531 A1* | 4/2021 | Shabtay | .............. G06F 18/2431 |
| 2021/0263139 A1* | 8/2021 | Ray | ........................ G01S 13/87 |
| 2022/0283265 A1* | 9/2022 | Bialer | ..................... G01S 13/42 |

* cited by examiner

*Primary Examiner* — Bo Fan (57) ABSTRACT

According to an aspect, a method of determining two dimensional (2D) angle of arrival (AoA) in a radar system comprising determining one dimensional (1D) AoA to generate a first set of (AoA), selecting a set of valid 1D AoA angles from the first set AoA, and determining the 2D AoA from the set of valid 1D AoA. Wherein the 1D AoA is determined on a first set of data received over a first uniform linear antenna array arranged in the first axis and the 2D AoA is determined on a second set data received over the first and the second MIMO antenna array arranged in the second axis and the set of valid 1D AoA in the first axis. Wherein the second antenna array need not be orthogonal to the first linear antenna array.

4 Claims, 7 Drawing Sheets

SYSTEM AND METHOD FOR DETERMINING ANGLE OF ARRIVAL IN A RADAR BASED POINT CLOUD GENERATION

CROSS REFERENCES TO RELATED APPLICATIONS

This application claims priority from Indian Patent application No.: 202141052298 filed on Nov. 15, 2021 which is incorporated herein in its entirety by reference

BACKGROUND

Technical Field

Embodiments of the present disclosure relate to radar system and in particular relates to a system and method for determining angle of arrival in radar based point cloud generation.

Related Art

Radar systems are generally employed for object detection and increasingly used in various automotive applications such as for driver assistance, obstacle detection, avoidance, and navigation of drones/UAVs, terrain mapping, for example. As is well known, radars can detect surrounding obstacles or objects and send the relevant information like distance, relative position, and direction and velocity of the object that are in motion to a controller (software or hardware) or to a decision making unit in the automotive device.

The point cloud often refers to set of points representing one or more objects in the three dimensional space detected by the radar system. Each point in the point cloud is represented by the distance (range), Azimuth, and Elevation angles in the three dimensional space. The Azimuth and/or Elevation angle are often determined by measuring the angle of arrival (AoA) of the received (reflected) signal. When the angle of arrival is determined in only one coordinate (say Azimuth or Elevation) the point cloud so formed, along with the range is a two dimensional point cloud. Similarly, when AoA is determined in both the coordinates, along with the range, the point cloud is three dimensional.

In some applications antenna arrays are employed to transmit and receive radar signal. The antenna array enables formation of an RF signal beam both for transmitting and receiving the radar signal. In that, time shifted (or phase shifted) radar signals are transmitted/received over the antennas to steer the beam in desired direction as is well known in the art. A two or three dimensional object shape and location is determined by steering the beam over a range/area.

Figure 1A:
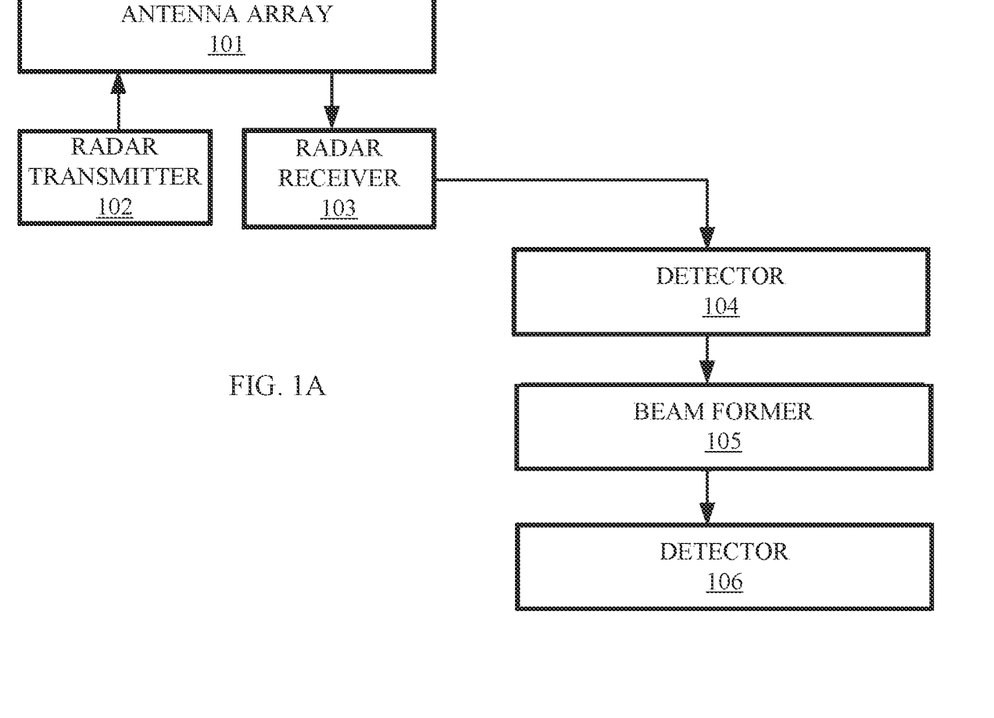
FIG. 1A illustrates one conventional technique for determining the range and angle.

Briefly, FIG. 1A illustrates a conventional technique for determining the range and angle. In that, antenna array 101 transmits and receives the radar signal. In that, antenna array 101 transmits the radar signal provided by the radar transmitter 102. As is well known, the radar transmitter 102 provides phase shifted version of a radar signal to the antenna array to form a beam in a desired direction and the phase angle is adjusted to steer the beam over the desired area. Similarly, the antenna array 101 receives the radar signal reflected from one or more objects and provides the received signal to the radar receiver 103.

Figure 1B:
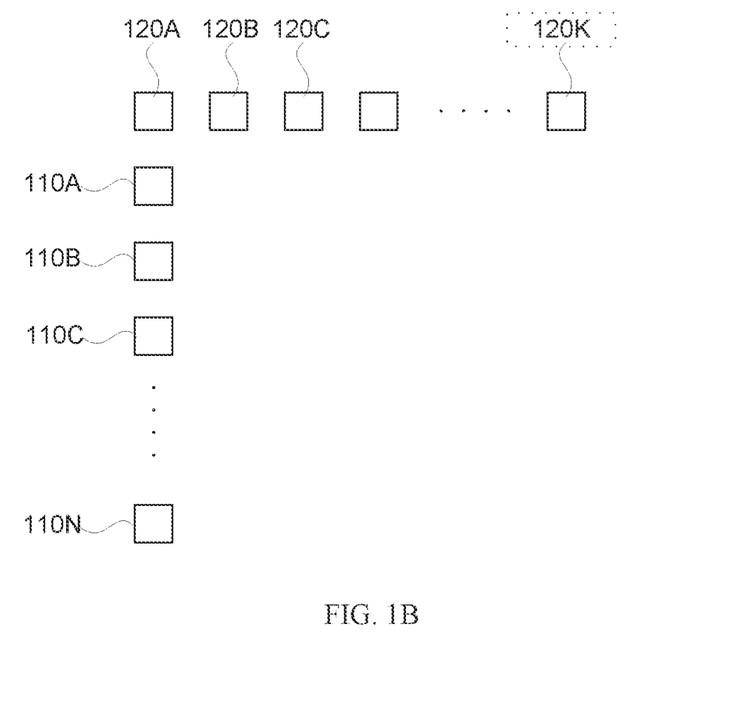
FIG. 1B illustrates an example antenna array 101 arrangement.
Figure 1C:
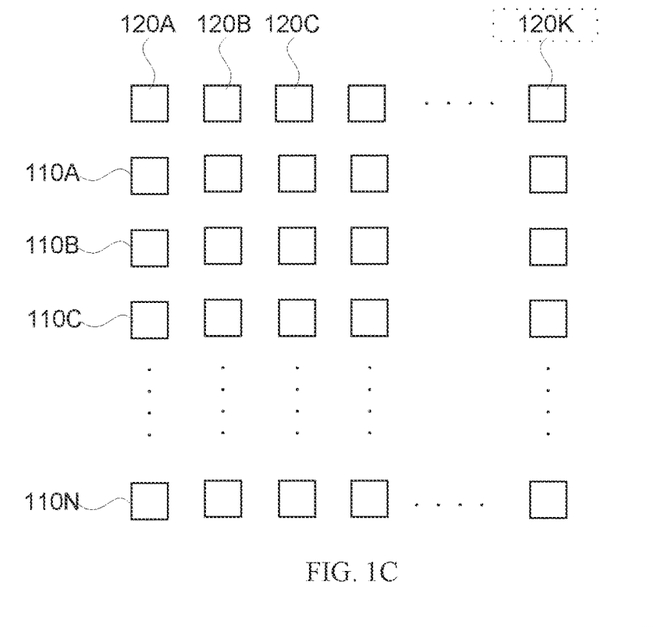
FIG. 1C illustrates the 2D MIMO antenna array for beam forming.

The arrangement of the antenna array and the geometrical precision determines the accuracy of the detection of the objects in two dimensions (2D) or three dimensions (3D) object. FIG. 1B illustrates an example antenna array 101 arrangement. In that, transmitting antenna array 110A-N is shown arranged in the vertical coordinate (along one of the desired axis, say Y-Axis) and the receiving antenna array 120A-K is shown arranged in the horizontal coordinate (along another axis of interest, say X-axis). The antenna elements are positioned at equidistance from one another (generally referred to as linear). In the MIMO configuration, the antenna array 110 and 120 together form two dimensional array with K columns and N rows (N×K) that are orthogonal to each other. FIG. 1C illustrates the equivalent 2D MIMO antenna array formed by the antenna arrangement in FIG. 1B. As well known in the art, the objects position/motion in vertical direction (elevation) is captured by the signal received on the vertically positioned antenna array and the objects position in horizontal directions (Azimuth) are captured/detected by signal received on the horizontal antenna array (orthogonal).

Continuing with respect FIG. 1A, the radar receiver 103 may demodulate and perform signal processing like Fast Fourier Transform (FFT) to extract range and Doppler. The range and Doppler is provided to the detector 104 that selects signals with Signal-to-Noise Ratio (SNR) higher than a preset threshold. The selected signal is provided to the beam former 105 for angle of arrival processing of the selected signals. The detector 106 selects the beam that corresponds to local peak. However such conventional radar system lacks resolution to detect objects with more precision. Additionally, the system may require antennas to be arranged geometrically precise. For example, the beam forming using FFT techniques may require the antenna arrangement to be uniformly spaced and geometrically orthogonal (as in FIG. 1B) creating a filled 2D MIMO array as shown in FIG. 1C.

Figure 1D:
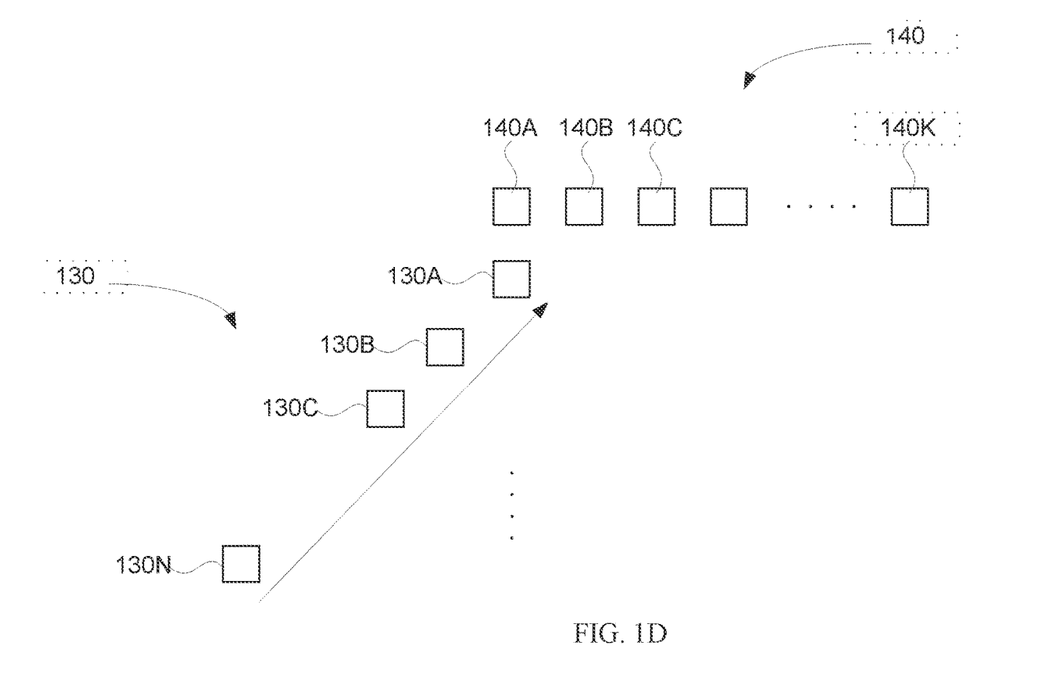
FIG. 1D illustrates the non-orthogonal antenna array.

In some instances, the antenna array is not formed geometrically uniform or orthogonal to each other nor the MIMO array be filled. For example, a combination of receive and transmit antennas can be used to create two 1D MIMO arrays in two axis instead of a filled 2D MIMO array, where the two 1D array may/may not be orthogonal to each other. FIG. 1D illustrates an example non-orthogonal MIMO antenna array. As shown there, the array 130 is aligned at an angle with the array 140. Each of the array (130 or 140) may be created using a combination of transmitters and receivers to maximize the individual 1D MIMO arrays while minimizing the number of physical transmit and receive channels required, thus forming two dimensional MIMO array as is well known. In that, due to non-orthogonality, the array 130 detects both azimuth and elevation of the object while the array 140 detects the object only in the azimuth and the resultant MIMO array is un-filled, unlike example in FIG. 1C. In such scenario, the beamforming using FFT may be inaccurate and erroneous.

In particular, when the radar system is employed for imaging (often referred to as imaging radar) or generating point cloud, a large field of view (FoV) as well as a high angle resolution (both azimuth and elevation) is desirable to get the shape and contour of a 3D object. For example, high angle resolution in a radar system enables representing a 3D object with a larger number of points for more accurate detection of the object. However, the beam width is limited by the antenna radiation pattern such as main lobe, side lobes etc., as is well known in the art. Some of the conventional techniques employed for detecting more objects (increase angle resolution) are described below for reference.

Figure 1E:
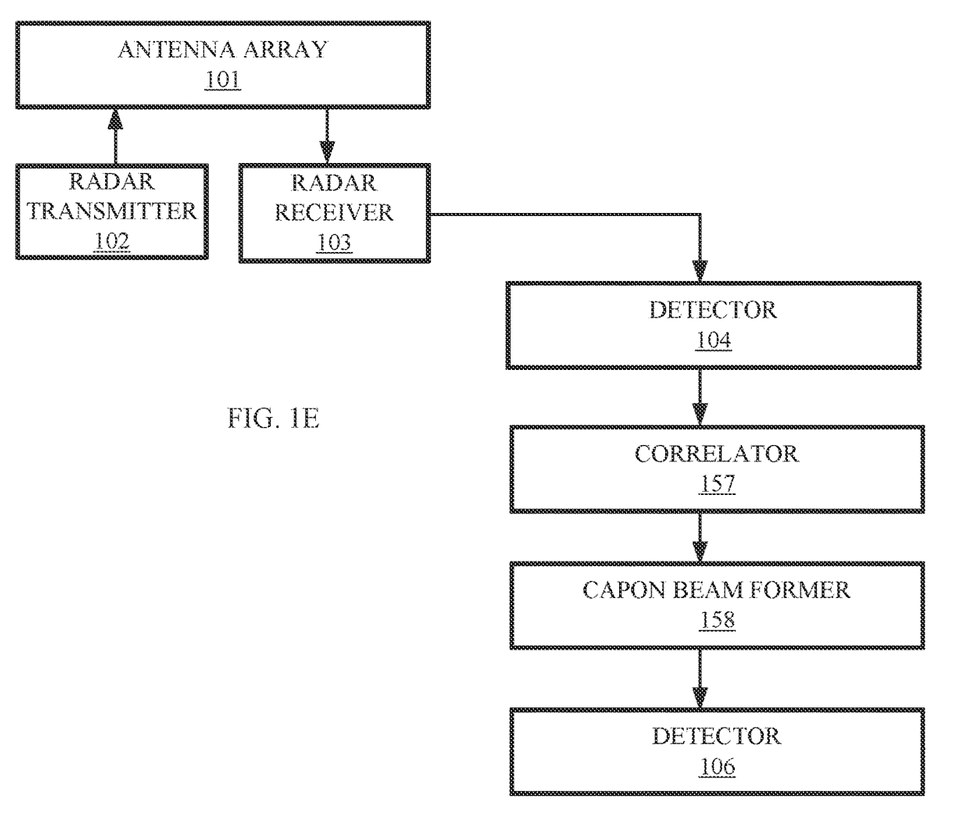
FIG. 1E illustrates another conventional technique.

FIG. 1E illustrates another conventional technique. As shown there, correlator 157 and Capon beamformer 158 are additionally employed between the detector 104 and 106. The correlator 157 makes use of the selected signal from detector 104 over multiple frames to determine the covariance. For example, the correlator 157 may perform correlation of the data received from the detector 104 with the data received over prior K frames. The correlated data is provided to the Capon beamformer 158 for generating the beam.

Due to correlation (data dependent beam forming) and Capon beamforming, the non-linearity and non-orthogonality in the antenna arrangement (for example, side lobes), errors are removed to an extent there by increasing the resolution as is well known in the art. However, such conventional technique requires buffering the data over K frames there by increasing the response time, at least.

As may be appreciated, the conventional techniques of FIG. 1E employs multiple snapshots of the received data and hence are referred to as data dependent beam forming. The conventional techniques consume high processing power and time to process large data to determine the 2D AoA, at least.

SUMMARY

According to an aspect, a method of determining two dimensional (2D) angle of arrival (AoA) in a radar system comprising determining one dimensional (1D) AoA to generate a first set of (AoA), selecting a set of valid 1D AoA angles from the first set AoA, and determining the 2D AoA from the set of valid 1D AoA and input data. Wherein the 1D AoA is determined on a first set of data received over a first linear MIMO antenna array arranged in the first axis and the first set of AoA comprising K angles, and the set of valid 1D AoA comprising L angles, in that L is less than K.

According to another aspect, the 2D AoA is determined on a second set data received over the 2D MIMO antenna array for the set of valid 1D AoA in the first axis. Wherein the second antenna array is may/may not be orthogonal to the first linear MIMO array.

According to another aspect, the 2D AoA is determined iteratively using relation $Res(k)=\|Y-A_{mi}(k)x\|_2$ such that Res(k) successively reduced by iteratively setting the values for x, in that Y represents the high SNR received signal, Ami represents the interpolated direction vector, k is a value representing number of iteration and x is a value determined at every iteration to minimize the residue Res(k).

According to another aspect, a radar system comprises, a two dimensional (2D) multiple input and multiple output (MIMO) antenna array arranged in first axis and second axis is configured to receiving a radar signal reflected from a set of objects, wherein MIMO antennas in the first axis form a uniform linear array, a range detector generating a set of ranges representing ranges of the set of objects, a Doppler detector generating a plurality of Doppler representing relative velocity of the set of object, a one dimensional (1D) angle of arrival generator configured to determine a first set of valid angles corresponding to the set of objects using only the MIMO antennas in the first axis, and a two dimensional (2D) angle of arrival generator configured to determine a second set of 2D angle of arrival using the first set of valid angles and the 2D MIMO antenna array.

Several aspects are described below, with reference to diagrams. It should be understood that numerous specific details, relationships, and methods are set forth to provide full understanding of the present disclosure. Skilled personnel in the relevant art, however, will readily recognize that the present disclosure can be practiced without one or more of the specific details, or with other methods, etc. In other instances, well-known structures or operations are not shown in detail to avoid obscuring the features of the present disclosure.

DETAILED DESCRIPTION OF THE PREFERRED EXAMPLES

Figure 2:
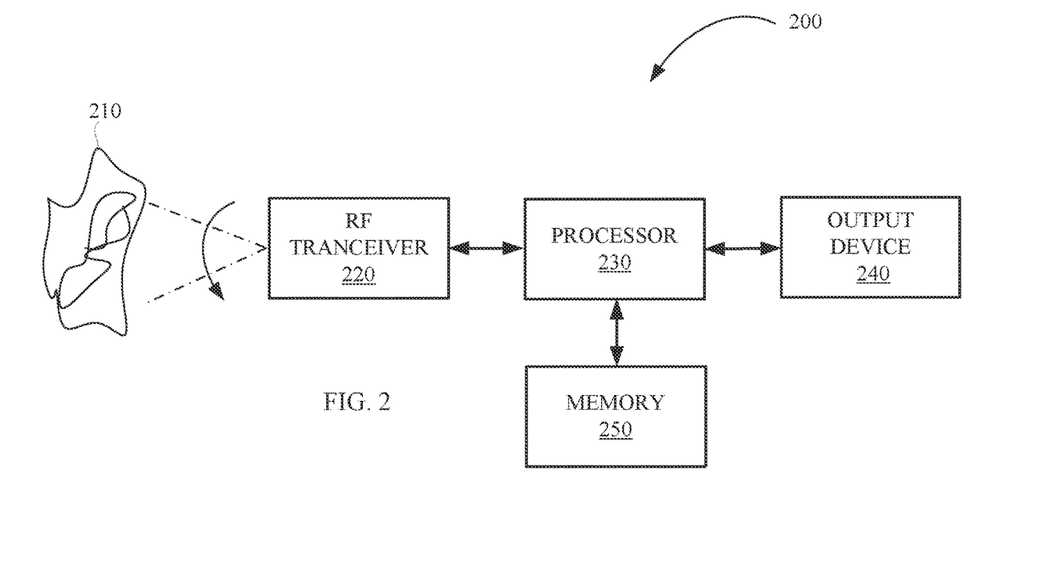
FIG. 2 is a block diagram of an example radar system (environment) in which various aspects of the present invention may be seen.

FIG. 2 is a block diagram of an example radar system 200 (environment) in which various aspects of the present invention may be seen. The environment is shown comprising objects 210, Radio Frequency (RF) transceiver 220, processor 230, output device 240 and memory 250. Each element in the system 200 is further described below.

RF transceiver 220 transmits a radar (RF) signal over a desired direction(s) and receives a reflected radar signal that is reflected by the object 210. In one embodiment, the RF transceiver 220 may employ multiple (one or more) receiving antennas to receive the reflected RF signal and multiple (one or more) transmitting antenna for transmitting the radar signal. Accordingly, the transceiver 220 may employ these multiple transmitting/receiving antennas in several of multiple input and multiple output (MIMO) configurations to form desired transmitting and receiving RF signal beam (often referred to as Beam forming) to detect objects from the reflected signal. The objects 210 may comprise a terrain, terrain projections, single object, cluster of objects, multiple disconnected objects, stationary object, moving object, live objects etc.

Processor 230 conditions and processes the received reflected RF signal to detect one or more objects (for example 210) and determines one or more properties of the objects. The properties of the object thus determined (like shape, size, relative distance, velocity, position in terms of azimuth and elevation etc.) are provided to the output device 240. In an embodiment, the processor 230 comprises signal conditioner to perform signal conditioning operations and provides the conditioned RF signal for digital processing. The memory 250 may store RF signal like samples of the reflected RF signal for processing. The processor 230 may temporarily store received data, signal samples, intermediate data, results of mathematical operations, etc., in the memory 250 (such as buffers, registers). In an embodiment, the processor 230 may comprise group of signal processing blocks each performing the specific operations on the received signal and together operative to detect object and its characteristics/properties.

The output device 240 comprises navigation control electronics, display device, decision making electronic circuitry and other controllers respectively for navigation, display and further processing the received details of the object. Accordingly, the system 200 may be deployed as part of unmanned vehicles, driver assistant systems, for obstacle detection, navigation and control, and for terrain mapping.

In an embodiment, the RF transceiver 220, processor 230, and memory 250 are implemented as part of an integrated circuit integrated with other functionality and/or as a single chip integrated circuit with interfaces for external connectivity like the output device 240. The manner in which the transceiver 220 and the processor 230 (together referred to as Radar transceiver) may be implemented in an embodiment is further described below.

Figure 3A:
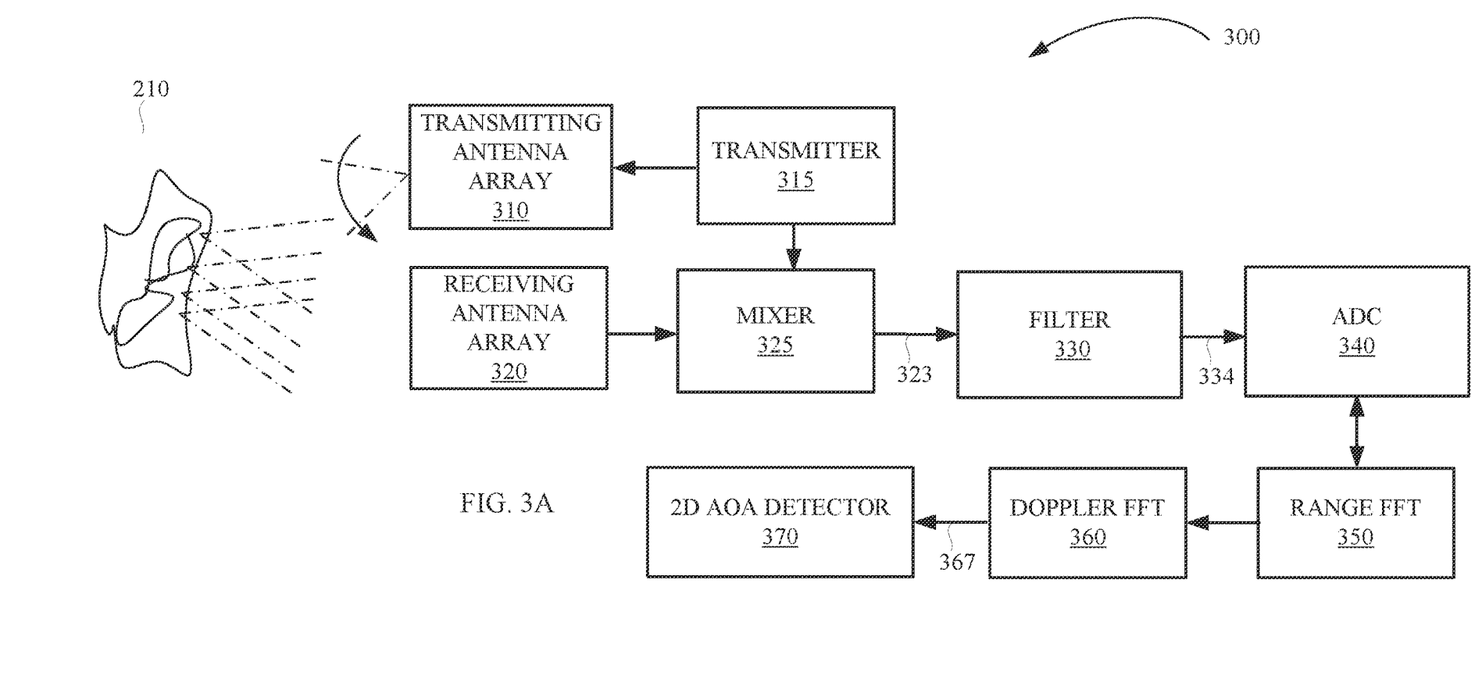
FIG. 3A is an example radar transceiver for object detection and recognition in an embodiment.

FIG. 3A is an example radar transceiver for object detection and recognition in an embodiment. The radar transceiver 300 is shown comprising transmitting antenna array 310, transmitter block 315, receiving antenna array 320, mixer 325, filter 330 Analog to digital convertor (ADC) 340, Range FFT 350, Doppler FFT 360 and AoA detector 370. Each element is described in further detail below.

The transmitting antenna array 310 and the transmitter 315 operate in conjunction to transmit RF signal over a desired direction. The transmitter 315 generates a radar signal for transmission and provides the same to the transmitting antenna array 310 for transmission. The transmitting antenna array 310 is employed to form a transmit beam with an antenna aperture to illuminate objects at suitable distance and of suitable size. Various known beam forming techniques may be employed for changing the illuminated region. In one embodiment, the transmitter 215 may generate a radar signal comprising sequence of chirps.

The receiving antenna array 320 comprises antenna elements each element capable of receiving reflected RF signal. The receiving antenna array 320 is employed to form an aperture to detect objects with a desired resolution (for example object of suitable size). The RF signal received on each element corresponding to one transmitted chirp represents one snapshot. The received signal (the sequence of snapshots corresponding to the sequence of chirps transmitted) is provided to the mixer 325.

The Mixer 325 mixes RF signal received on each antenna element in the array with the transmitted chirp (local oscillator frequency) to generate an intermediate frequency signal (IF signal). In that the mixer 325 may comprise number of complex or real mixers to mix each RF signal received on the corresponding antenna elements. Alternatively, the mixer 325 may comprise of fewer mixers multiplexed to perform desired operation. The number of intermediate frequency (IF) signal is provided on path 323 to filter 330. The filter 330 passes the IF signal attenuating the other frequency components (such as various harmonics) received from the mixer.

Figure 3B:
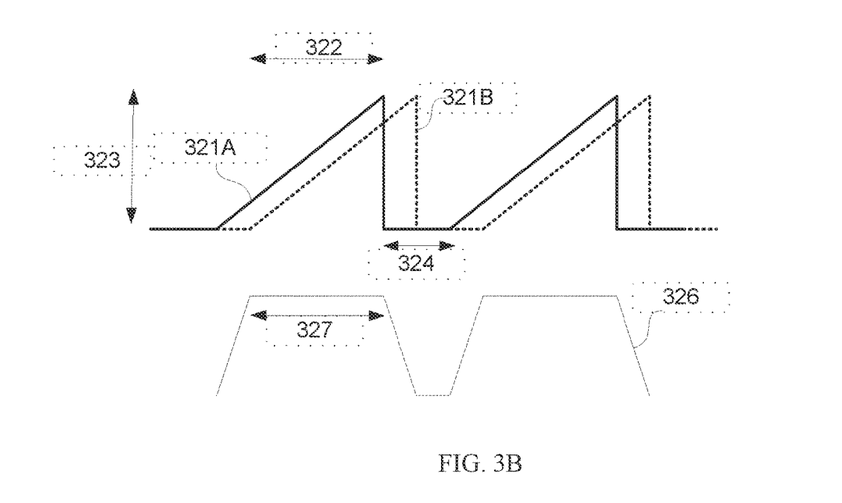
FIG. 3B illustrates the example transmitted and received chirps in an embodiment.

FIG. 3B illustrates the example transmitted and received chirps in an embodiment. The curve 321A represents the transmitted chirps, the curve 321B represents the received chirps and the curve 326 representing the baseband signal (IF signal). In that, 322 representing the active chirp time, 323 representing the chirp bandwidth, 324 representing the chirp idle time and 327 representing the chirp usable time.

Continuing with FIG. 3A, the filter 330 may be implemented as a pass band filter to pass a desired bandwidth (in conjunction with chirp bandwidth BW). The filtered IF signal is provided on path 334 to ADC 340.

The ADC 340 converts IF signal received on path 334 (analog IF signal) to digital values. The ADC 340 may sample the analog IF signal at a sampling frequency Fs and convert each sample value to a bit sequence or binary value. In one embodiment the ADC 340 may generate 256/512/1024 samples per chirp signal. That is, N samples in the time period 327. The digitized samples of IF signal (digital IF signal) is provided for further processing.

The Range Fast Fourier transform (FFT) 350, performs FFT on the digital IF samples to generate plurality of ranges of the plurality objects 210. For example, range FFT 350 performs FFT on digital IF signal corresponding to each chirp. The Range FFT 350 produces peaks representing the ranges of the objects.

The Doppler FFT 360 performs FFT operation on the ranges across chirps. The peaks in the Doppler FFT represent the Doppler of the objects or the velocity of the objects. The ranges and Doppler of the objects are provided to the AoA detector 370.

The AoA detector 370 determines the angle of arrival and estimates the azimuth and elevation the objects and points to form the points cloud. The AoA detector 370 detects objects with higher resolution with a reduced computational complexity and data processing from the RF signal received on the receiving antenna array 320 with resolution corresponding and/or in excess of the physical limitation of the antenna array. Thus, enhancing the antenna aperture. The manner in which the AoA detector 370 detects the azimuth and elevation in an embodiment is further described below.

Figure 4:
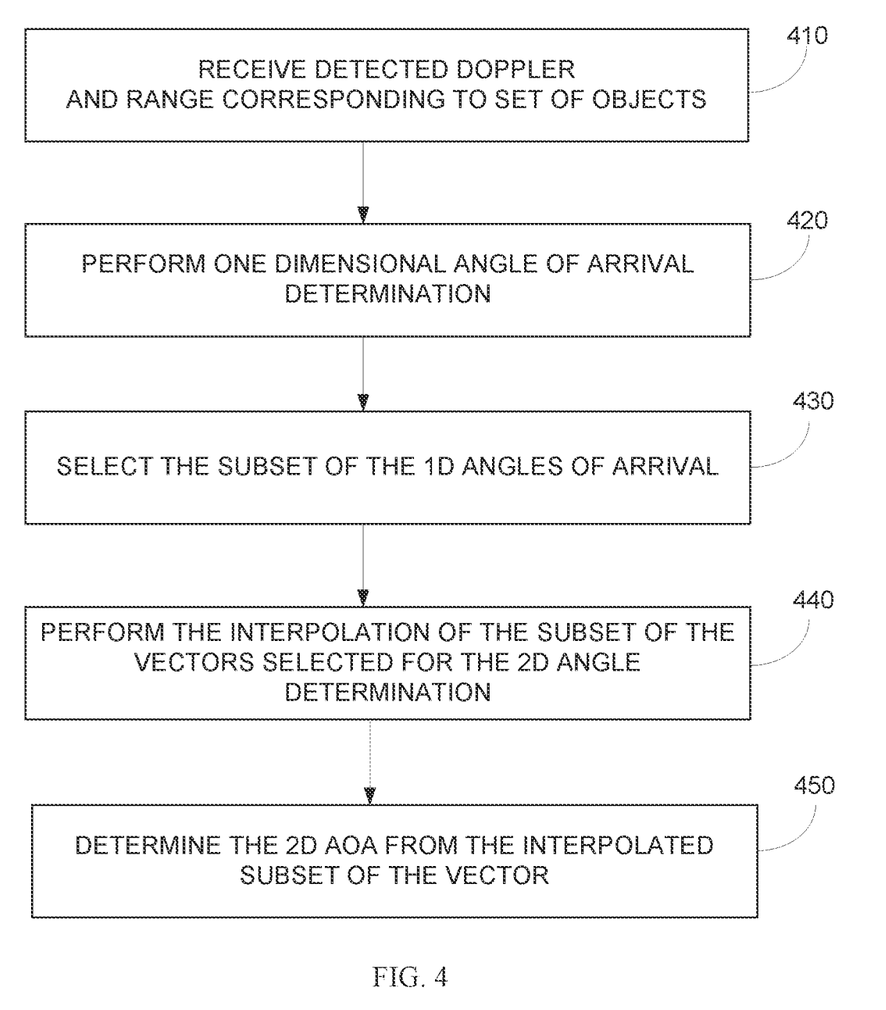
FIG. 4 is a block diagram illustrating the manner in which the 2D angle of arrival is determined in an embodiment.

FIG. 4 is a block diagram illustrating the manner in which the 2D angle of arrival is determined in an embodiment. In the block 410, the AoA detector 370, receives detected Doppler and range corresponding to set of object/points detected. The range and Doppler may be as received on path 367.

In the block 420, the AoA detector 370, performs one dimensional angle of arrival determination. The one dimensional angle of arrival may correspond to one of the azimuth or elevation. That is, the AoA detector 370 uses only a partial data received on the antenna array (to say, a subset of the antenna array for processing). For example, the partial data corresponds to data receive on the selected antennas (also referred to as sensors) of the antenna array. The partial or set of antennas (or elements) are selected such that they are capable of determining the one dimensional angle of arrival instead of two dimensions. That is, selected antennas are from a row or a column that is linear. Accordingly, the one dimensional AoA may be one of elevation or azimuth only as may be the case.

In the block 430, the AoA detector 370, selects the subset of the 1D angles of arrival. In one embodiment, the subset of the 1D angles of arrival determined may comprise prominent peak in the angle estimation spectrum or in the beam former employed for determining the 1D AoA. A threshold value may be set to select the desired vectors (or angle of arrival) in 1D estimation. The only the vectors above the threshold value are selected as the subset for the determination of 2D angle of arrival.

In the block 440, the AoA detector 370 performs the interpolation of the subset of the direction vectors selected for the 2D angle determination. In one embodiment, the interpolation may be performed based on the operating conditions like desired resolution, RF bandwidth, and Field of view (FOV). The interpolated set of data is used for 2D AoA determination.

In the block 450, the AoA detector 370 determines the 2D AoA from the interpolated subset of the direction vector. As may be appreciated, the AoA detector 370 is configured to perform the angle of arrival estimation successively (Successive angle estimation), i. e., at first 1D angle estimation and then 2D estimation on the selected data set derived from 1D AoA estimation. As a result, the 2D AoA determination is performed over limited direction vectors instead of entire set. Thus, the processing power and time for determining 2D AoA is reduced. In one embodiment, advantage of the reduced set of data processing is utilized to enhance the resolution in 1D AoA determination and 2D AoA determination.

Figure 5:
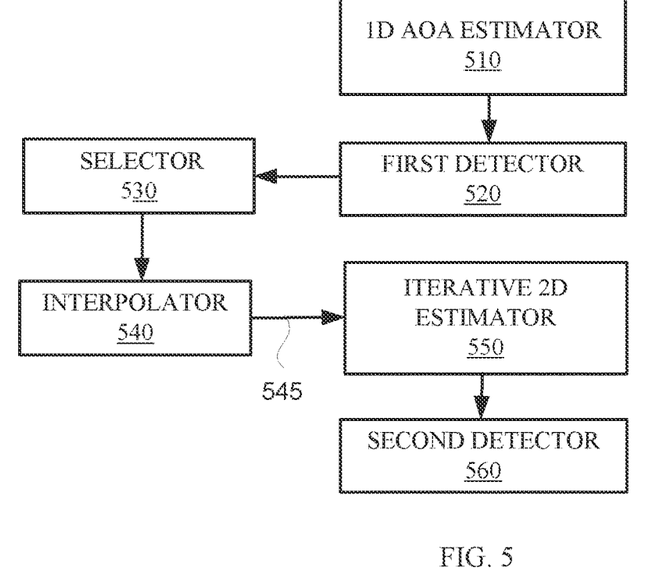
FIG. 5 is a block diagram illustrating the manner in which 2D AoA may be implemented in an embodiment.

FIG. 5 is a block diagram illustrating the manner in which 2D AoA may be implemented in an embodiment. The block diagram is shown comprising 1D AoA estimator 510, first detector 520, selector 530, interpolator 540, Iterative 2D estimator 550, and the second detector 560. Each block is described in further detailed below.

The 1D AoA estimators 510 is configured to perform 1D angle of arrival estimation over the one dimensional antenna array. In one embodiment the one dimensional antenna array is linearly arranged either in the azimuth or elevation such that, it is orthogonal to the other axis and also linear in its axis. The data received on the path 367 for every antenna in the 1D antenna array is processed for determination of 1D AOA. The processing may be a one of a one dimensional FFT over the antenna array or beamforming operation at a desired resolution. In case of a beam forming, any of the known beam forming techniques may be implemented such as capon Beam forming, for example. The 1D AoA may provide a K number of points representing the K angles. The K may be selected based on the resolution and the Field of View.

The first detector 520 selects the number of points that are valid. For example, the first detector 520 may select L number of points from the K points that are above a threshold (in case of FFT) or based on a below a residual value (in case of iterative beam forming).

The selector 530 generates the antenna matrix having a reflection coefficient or direction vector of the antenna array forming the two dimensions corresponding to the L 1D AoA's. That is, the selector may prepare L×M antenna matrix where the M is the antenna elements in the other axis. That is, in case if K is linear array in the azimuth, the M may be the array in the elevation that may not be orthogonal to K antenna array in the azimuth.

The interpolator 540 interpolates the L×M matrix based on the resolution and field of view (FOV) required. Interpolator 540 may set the search space for iterative angle estimation in 2D. The interpolated data is provided to the iterative 2D estimator 550.

The iterative 2D estimator 550 estimates the two dimensional angle of arrival for the set of data over the interpolated L×M antenna matrix. In one embodiment, the iterative 2D estimator 550 chooses 2D-AoA from among the components iteratively by reducing the residual error, that is measured as a function of the incoming data (on path 367). The Selection of the number of outputs at each stage is done using one or more criteria such as using a relative threshold from the output having maximum strength, iterate for pre-defined number of iteration(s) and selecting a solution of particular iteration if residual error is smaller than pre-defined threshold.

In one embodiment, the iterative 2D estimator 550 employs relation: $Res(k) = \|Y - A_{mi}(k)x\|_2$, in that, Y represents the data received on path 367, $A_{mi}$ represents the interpolated direction vector on the path 545, k is the number of iteration and x is the value determined at every iteration to minimize the residue Res(k). The relation may be iterated as long as the res(k) is greater than pre-defined threshold or may be iterated over a pre-defined number of iterations (k). As an example the residual value less than 5 percent of Y in general implies that 95 percent of the energy of the incoming signal has been assigned to detected targets. The iterated data with the peaks above a threshold are provided to the second detector 560.

The second detector 560 may perform operation similar to the first detector 520 and select the valid angles. The valid two dimensional angles of arrival representing the Azimuth and Elevation corresponding to each object/point detected in and received on path 367 is provided as 3D point cloud.

Figure 6:
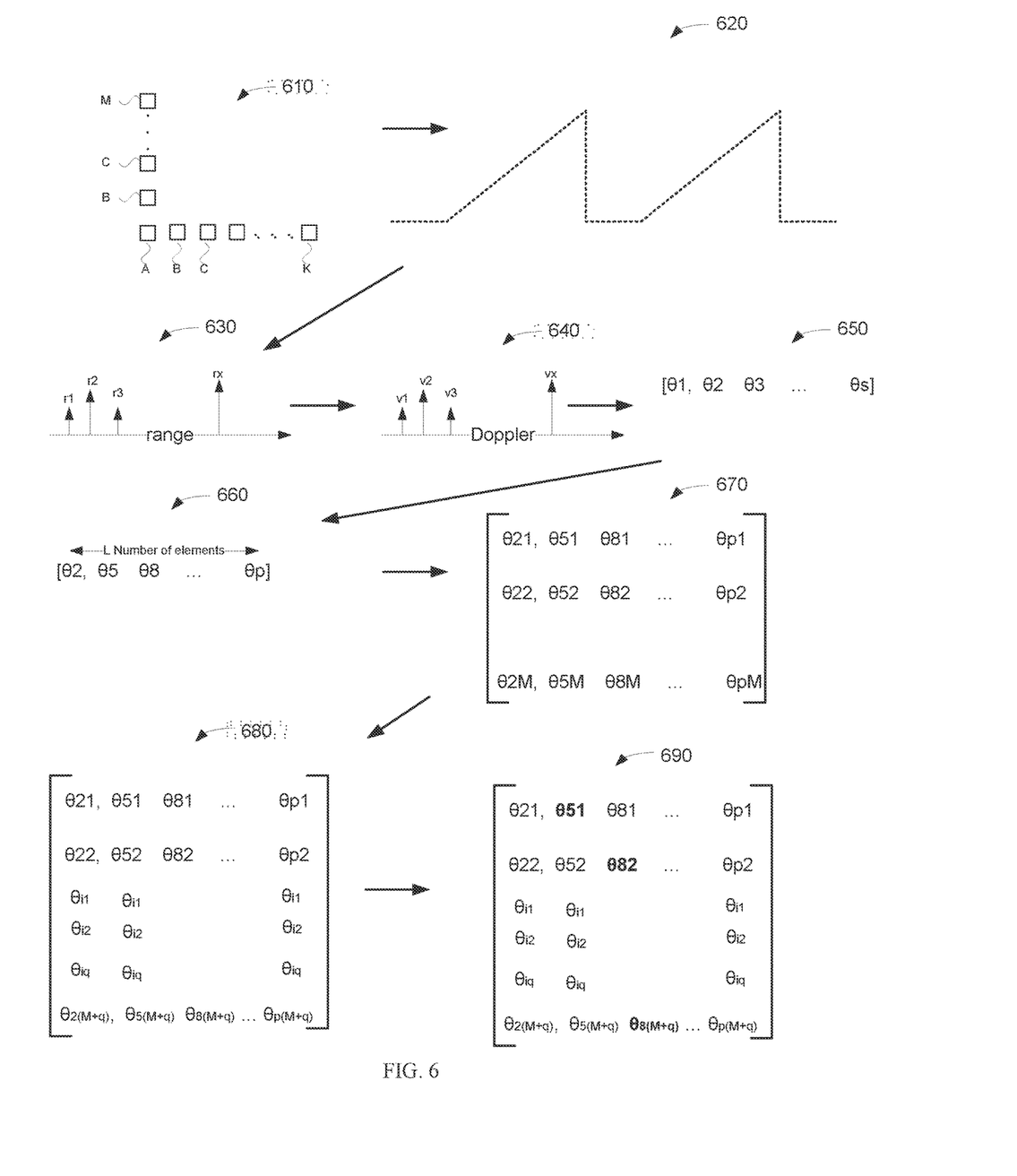
FIG. 6 is a graphical representation illustrating the manner in which iterative AoA is performed in an embodiment.

FIG. 6 is a graphical representation illustrating the manner in which iterative AoA is performed in an embodiment. In that 610 represents MIMO antenna array with K×M antennas. The 620 represents the data set received on each antenna in the array 610. The 630 represents the set of ranges (r1, r2 ... rx) determined in the range FFT 350, the item 640 represents the velocities (Doppler) v1, v2, ... vx determined by the doppler FFT 360.

Matrix 650 represents the 1D AoA determined by the 1D AoA estimator 510. In that, $\theta_1, \theta_2 \ldots \theta_s$ representing the angle detected over a search space in 1D, and $\theta_1 \sim \theta_2$ representing the angle resolution and $\theta_1 \sim \theta_s$ representing the FoV in one direction (Azimuth). Matrix 660 represents the angles determined as valid by the first detector 620, The matrix 660 is shown comprising $\theta_2, \theta_5, \ldots \theta_p$ (L angles from S angles in 650). The matrix 670 represents antenna matrix generated by the selector 530. The antenna matrix 670 is shown comprising L×M elements $\theta_{21}, \theta_{22}, \theta_{23}, \ldots \theta_{2M}, \theta_{51}, \theta_{52}, \theta_{53}, \ldots \theta_{5M} \ldots \theta_{p1}, \theta_{p2}, \theta_{p3}, \ldots \theta_{pM}$.

The item 680 represents the interpolated data provided by the interpolator 540. As shown there the data is shown comprising additional data points $\theta_{i1}, \theta_{i2} \ldots \theta_{iq}$, in each column. Though q number of data points is shown to have been added in sequence for illustration, each column may contain the added data points at interspersed. In that $\theta_1 \sim \theta_{q+M}$ represents FoV in the elevation and $\theta_{q+M-1} \sim \theta_{q+M}$ representing the resolution the elevation. Item 690 represents the selected angles in the 2D AoA as valid by the second selector 560. The bold values illustrate the selected values in the 2D.

While various embodiments of the present disclosure have been described above, it should be understood that they have been presented by way of example only, and not limitation. Thus, the breadth and scope of the present disclosure should not be limited by any of the above-discussed embodiments, but should be defined only in accordance with the following claims and their equivalents.

What is claimed is:

1. A method of determining two dimensional (2D) angle of arrival (AoA) in a radar system comprising:
    determining a first set of angles of arrival (AoAs) with respect to only one of an azimuth or an elevation;
    selecting at least one angle of arrival from the first set of AoAs; and
    determining the 2D AoA for said at least one angle of arrival, wherein the 2D AoA representing an angle measured with reference to both azimuth and elevation, wherein the 2D AoA is determined iteratively using relation $Res(k) = \|Y - A_{mi}(k)x\|_2$ such that Res(k) successively reduced by iteratively setting the values for x, in that Y represents the high SNR received signal, $A_{mi}$ represents the interpolated direction vector, k is a value representing number of iteration and x is a value determined at every iteration to minimize the residue Res(k).

2. The method of claim 1, wherein the first set of AoAs are determined from a first set of data received over a first linear antenna array arranged in a first axis, wherein the first axis is one of Azimuth or elevation.

3. The method of claim 2, wherein the 2D AoA is determined from a second set of data received over the first and the second antenna array arranged in the first axis and a second axis, wherein the second antenna array is not orthogonal to the first linear antenna array.

4. A radar system comprising:
a two dimensional (2D) multiple input and multiple output (MIMO) antenna array arranged in first axis and second axis is configured to receiving a radar signal reflected from a set of objects, wherein MIMO antennas in the first axis are linear and uniform;

a range detector generating a set of ranges representing ranges of the set of objects;

a Doppler detector generating a plurality of Doppler representing relative velocity of the set of object;

a one dimensional (1D) angle of arrival generator configured to determine a first set of valid angles corresponding to the set of objects using only the antennas in the first axis; and a two dimensional (2D) angle of arrival generator configured to determine the 2D angle of arrival using the first set of valid angles and the antennas in the first and the second axis of the MIMO antenna array, wherein the 2D AoA is determined iteratively using relation $Res(k)=\|Y-A_{mi}(k)x\|_2$ such that Res(k) successively reduced by iteratively setting the values for x, in that Y represents the high SNR received signal, $A_{mi}$ represents the interpolated direction vector, k is a value representing number of iteration and x is a value determined at every iteration to minimize the residue Res(k).

* * * * *